Nov. 6, 1923.

G. O. HOLSTAD 1,473,555

TRANSMISSION

Filed June 6, 1921     3 Sheets-Sheet 1

G. O. Holstad
INVENTOR

BY Victor J. Evans
ATTORNEY

WITNESS:
E. R. Ruppert.

Nov. 6, 1923.

G. O. HOLSTAD 1,473,555

TRANSMISSION

Filed June 6, 1921

WITNESS: E. R. Ruppert

G. O. Holstad
INVENTOR

BY Victor J. Evans
ATTORNEY

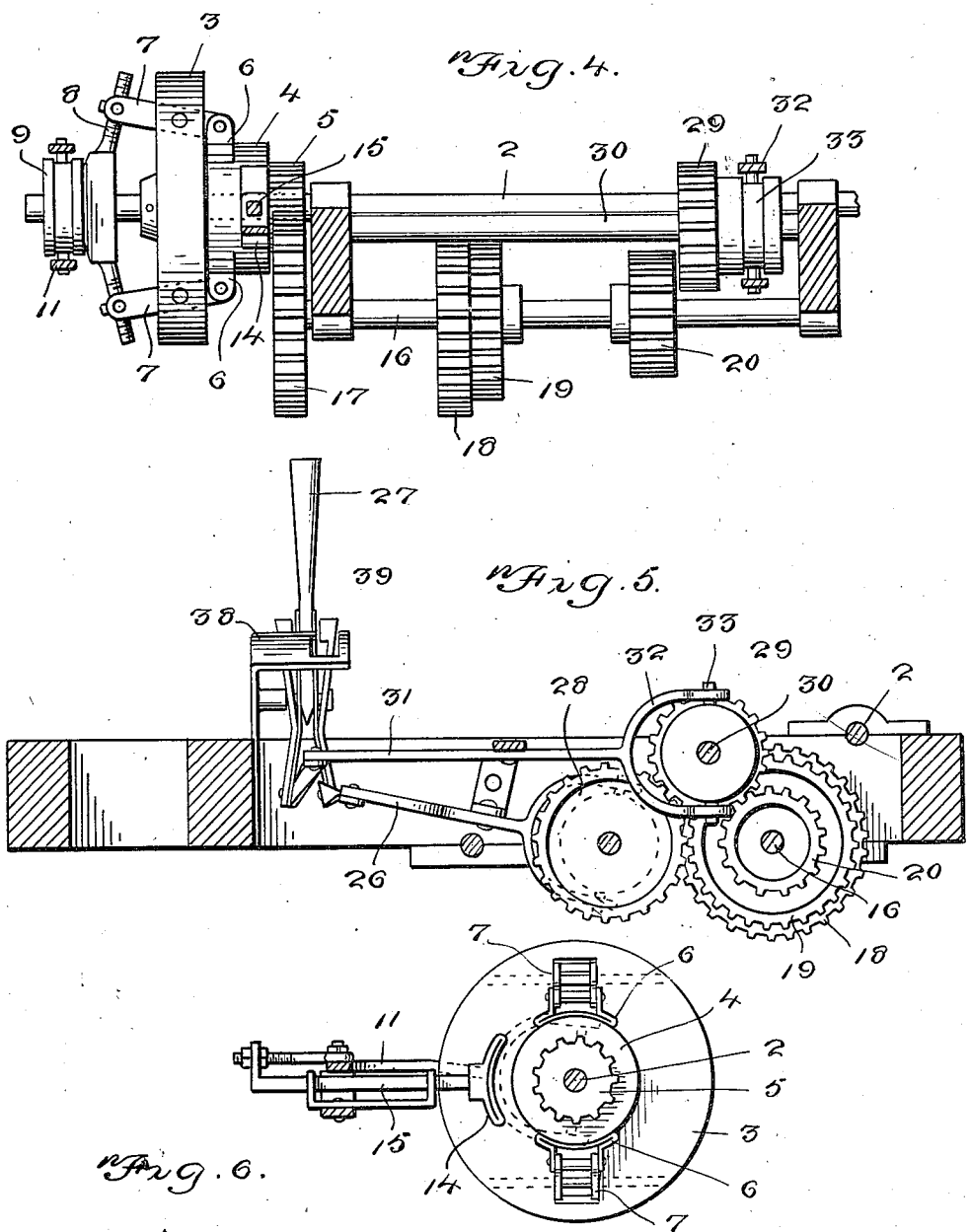

Patented Nov. 6, 1923.

1,473,555

UNITED STATES PATENT OFFICE.

GILBERT O. HOLSTAD, OF RIDGEWAY, IOWA.

TRANSMISSION.

Application filed June 6, 1921. Serial No. 475,316.

*To all whom it may concern:*

Be it known that I, GILBERT O. HOLSTAD, a citizen of the United States, residing at Ridgeway, in the county of Winneshiek and State of Iowa, have invented new and useful Improvements in Transmissions, of which the following is a specification.

This invention relates to a transmission means for motor vehicles, such as tractors, the principal object of the invention being to provide simple and effective means for transmitting the motion of the drive shaft to the drive wheels by a system of gearing, so arranged that they can be easily shifted into and out of mesh so as to permit the vehicle to be moved forwardly at either one of two different speeds or to be reversed.

Another object of the invention is to so arrange the parts that the gears can be shifted by a single lever and that the clutch can be released and the transmission brake applied by a single clutch lever, said lever releasing the clutch and applying the brake when moved in one direction and removing the brake and throwing in the clutch when moved in the other direction.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 4 is a section on line 4—4 of Figure 1.

Figure 5 is a section on line 5—5 of Figure 1.

Figure 6 is a section on line 6—6 of Figure 1.

Figure 1:
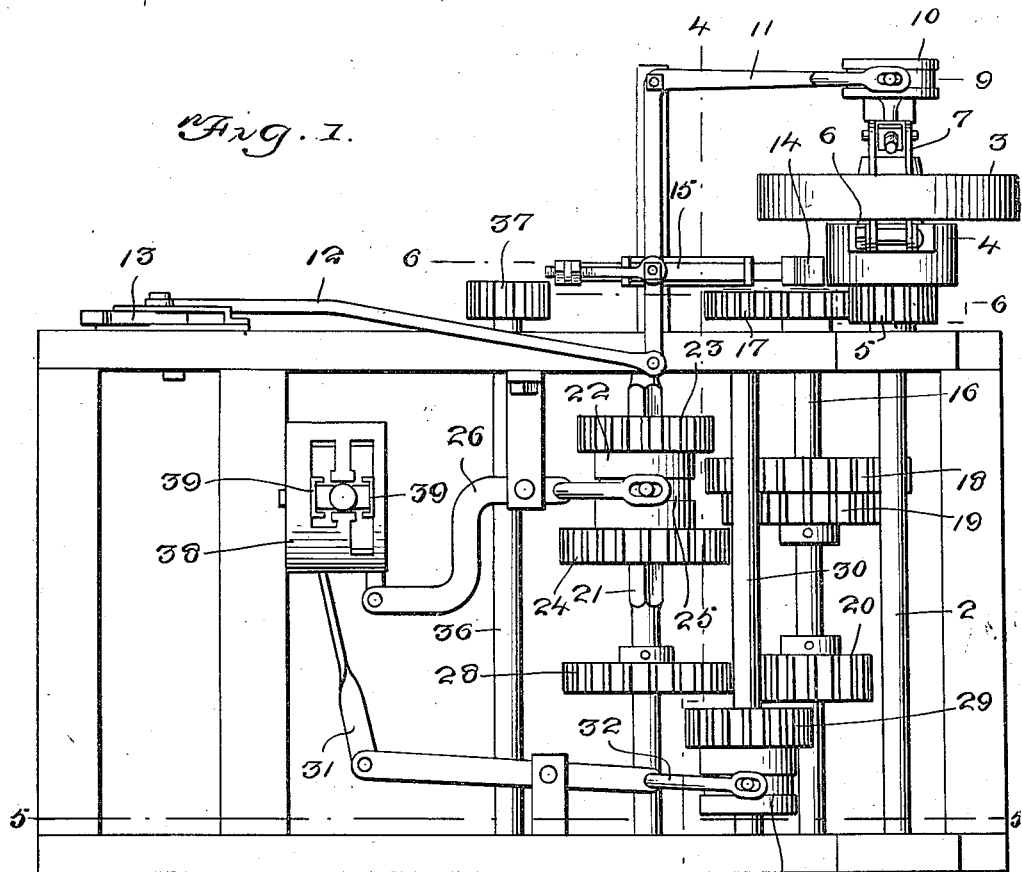
Figure 1 is a plan view of the invention.
Figure 7:
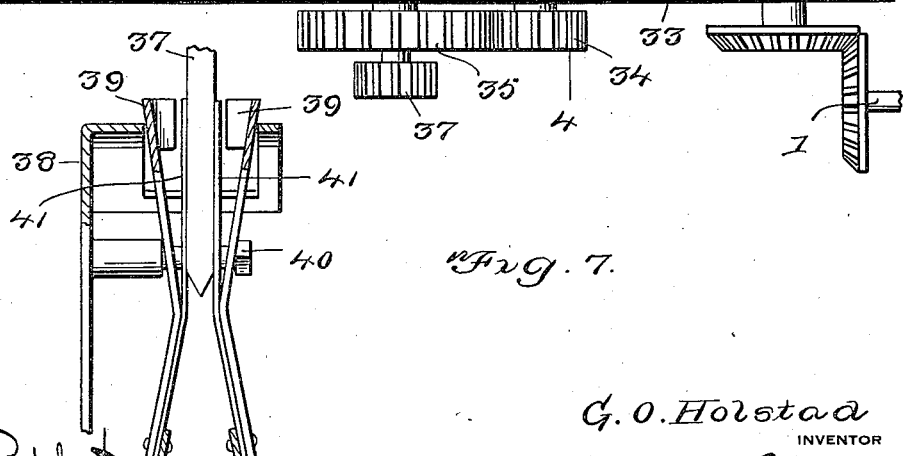
Figure 7 is a sectional detail view showing the gear shifting lever 37 and its associated parts.
Figure 2:
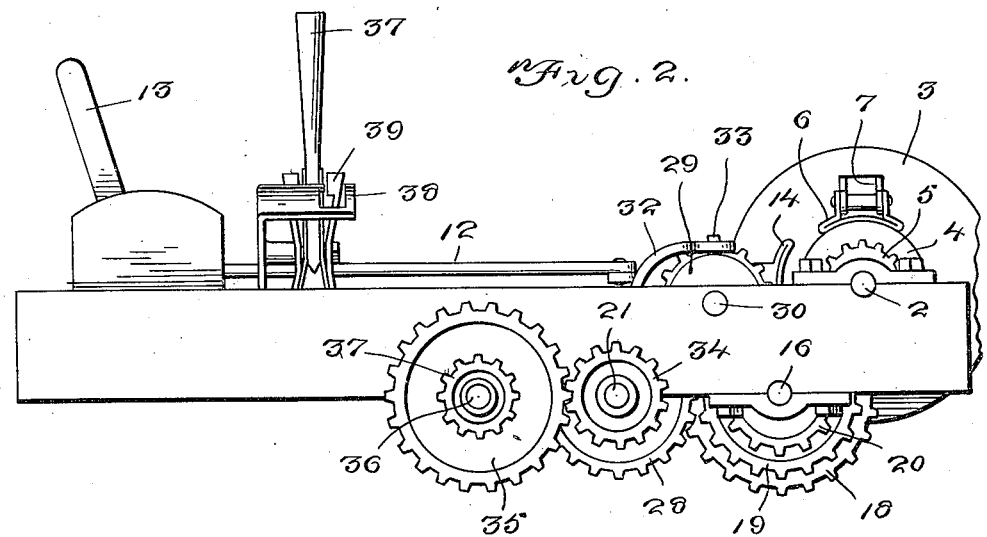
Figure 2 is a side view thereof.
Figure 3:
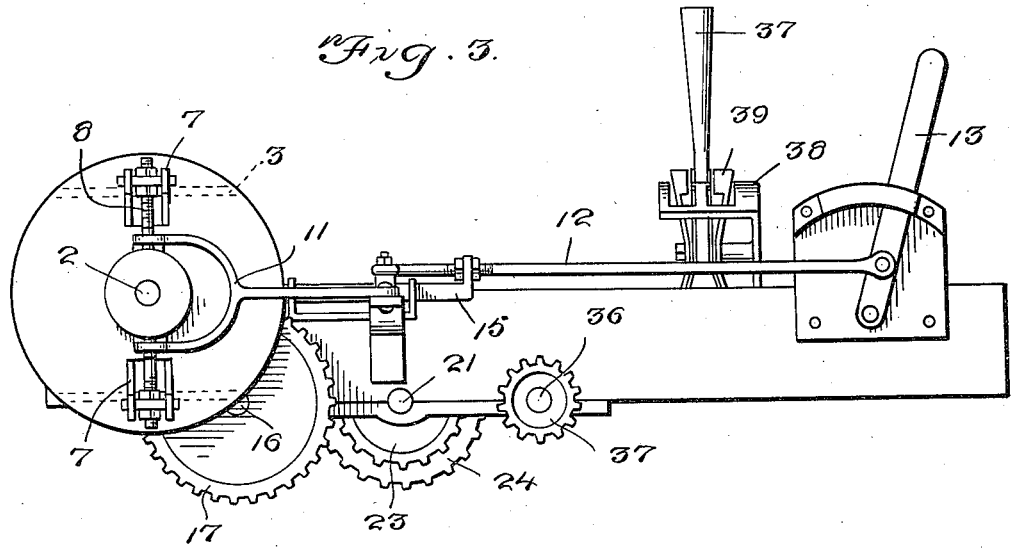
Figure 3 is a view of the other side.

In these views 1 indicates the drive shaft which is geared to the clutch shaft 2. This clutch shaft carries the fly wheel 3, which is keyed to the shaft, and the clutch drum 4 which is rotatably mounted on the shaft and has formed therewith or secured thereto a pinion 5. The fly wheel 5 carries the brake shoes 6 which engage with the drum 4, these shoes being located on the inner ends of the levers 7 pivotally mounted in the fly wheel and having their outer ends adjustably secured to the member 8 which is slidably but non-rotatably secured to the clutch shaft 2. This member is provided with a groove 9 which receives a collar 10, the projections on the collar being engaged by the forked end of a lever 11 which is connected by a link 12 with the hand lever 13. A brake shoe 14 is arranged to engage the clutch drum 4, the stem 15 of said shoe being slidably mounted and adjustably connected with the lever 11. These parts are so arranged that when the hand lever 13 is moved in one direction the brake shoe 14 will be disengaged from the clutch drum and the brake shoes 6, carried by the fly wheel, will be engaged with said drum. When the hand lever is moved in the other direction the brake shoe 14 will be engaged with the clutch drum and the brake shoes 6 on the fly wheel will be disengaged from the drum. In this latter position of the parts the clutch drum and its pinion will remain idle while the fly wheel will rotate with the shaft.

A rotatable shaft 16 carries a gear 17 which meshes with the pinion 5. This shaft carries the high speed gear 18, the low speed gear 19 and the reverse gear 20. The sliding gear shaft 21 carries the sleeve 22 which is slidably but non-rotatably mounted on said shaft. This sleeve carries the high speed gear 23 and the low speed gear 24, the sleeve being so formed that it can be moved to a position where its gears will be entirely out of mesh with the high and low gears 18 and 19 or it can be moved to a position to place the high speed gears into mesh or the low speed gears into mesh. This sleeve carries a rotatable collar 25, the pinions on which are engaged by the forked end of lever 26 which is suitably connected with the gear shift lever 27. The sliding gear shaft 21 also carries the reverse gear 28 and a third reverse gear 29 is slidably and rotatably mounted on a stationary shaft 30 and is adapted to be moved into and out of mesh with the reversing gears 20 and 29 from gear shift lever 27 by means of the connections 31 which include the forked lever 32 engaging the projections on collar 33 which is rotatably connected with the reversing gear 29.

The sliding gear shaft 21 carries a pinion 34 which meshes with a gear forming part of the differential 35 connected with the driven shafts 36 to which the pinions 37 are connected for engaging the internal rack of the bull wheels.

The gear shift lever 27 works in a housing 38 which is slotted in such a manner as to permit said lever to be moved from a neutral position to a position with the low speed gears in mesh or to a position with the high speed gears in mesh or to a third position with the reversing gears in mesh.

I may associate with the gear shift lever 27 a pair of levers 39 which are pivotally mounted intermediate their ends upon the pivot pin 40 of said lever 27. These levers 39 are arranged one on each side of the lever 27 and have their upper ends of channel shape to receive a part of said lever 27. The lower ends of said levers 39 are connected with the forked levers 26 and 32. Springs 41 associated with the channel levers 39 tend to hold the gear shift lever 27 in its neutral position. By moving said lever 27 in one direction it will be placed in engagement with the channel lever connected with the high and low speed gears and when moved in the other direction it will be placed in engagement with the channel lever which is connected with the reversing gear.

From the above it will be apparent that the bull wheels can be disconnected from the engine by either the clutch lever 13 or the gear shift lever 27. It will also be seen that the clutch lever 13 not only controls the engagement and disengagement of the clutch but also applies and removes the brake from the clutch drum. The gear shift lever when in neutral position moves all the gears out of mesh and controls the forward speed of the vehicle and its reverse.

This transmission mechanism can be placed at any desired point on the tractor. When one set of gears are in mesh all the others are out of mesh so that there is no wear on these other gears and no waste of power due to friction of idling gears meshing with each other. The control is also very simple as it consists of but the one gear shift and one clutch lever.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. A transmission of the class described comprising a clutch shaft, a second shaft, clutch means for connecting the two shafts together, high and low speed gears on said second shaft, a reversing gear on said second shaft, a sliding gear shaft, a sleeve slidably but non-rotatably mounted on the said shaft, high and low speed gears carried by the sleeve, a reversing gear carried by the sliding gear shaft, a slidably and rotatably mounted reversing gear, a gear shift lever, means connecting the same with the sliding reversing gear and with the sliding sleeve, a driven shaft and means for connecting the same with the sliding gear shaft.

2. A transmission of the class described comprising a clutch shaft, a second shaft, clutch means for connecting the two shafts together, high and low speed gears on said second shaft, a reversing gear on said second shaft, a sliding gear shaft, a sleeve slidably but non-rotatably mounted on the said shaft, high and low speed gears carried by the sleeve, a reversng gear carried by the sliding gear shaft, a slidably and rotatably mounted reversing gear, a gear shift lever, means connecting the same with the sliding reversing gear and with the sliding sleeve, such means including a member connected with the sliding reversing gear and another member connected with the sliding sleeve, each member having a part for receiving the shift lever and spring means for normally holding the lever out of engagement with said members.

In testimony whereof I affix my signature.

GILBERT O. HOLSTAD.